US008086582B1

(12) United States Patent
Wills et al.

(10) Patent No.: US 8,086,582 B1
(45) Date of Patent: Dec. 27, 2011

(54) SYSTEM, METHOD AND COMPUTER PROGRAM PRODUCT FOR SCANNING AND INDEXING DATA FOR DIFFERENT PURPOSES

(75) Inventors: Ronald Holland Wills, McKinney, TX (US); Charles Allen Ross, Plano, TX (US); George L. Heron, Forest Hill, MD (US)

(73) Assignee: McAfee, Inc., Santa Clara, CA (US)

( * ) Notice: Subject to any disclaimer, the term of this patent is extended or adjusted under 35 U.S.C. 154(b) by 687 days.

(21) Appl. No.: 11/959,113

(22) Filed: Dec. 18, 2007

(51) Int. Cl.
*G06F 17/30* (2006.01)
(52) U.S. Cl. ............. 707/705; 707/966; 726/1; 709/202
(58) Field of Classification Search .................. 707/741, 707/999.002, 705, 966; 709/202; 726/1
See application file for complete search history.

(56) References Cited

U.S. PATENT DOCUMENTS

| | | | | |
|---|---|---|---|---|
| 4,633,393 | A * | 12/1986 | Rundell ................................. | 1/1 |
| 6,765,864 | B1 * | 7/2004 | Natarajan et al. ............. | 370/224 |
| 6,823,341 | B1 * | 11/2004 | Dietz .................................... | 1/1 |
| 7,028,022 | B1 * | 4/2006 | Lightstone et al. .................... | 1/1 |
| 7,096,503 | B1 * | 8/2006 | Magdych et al. ............... | 726/25 |
| 7,178,166 | B1 * | 2/2007 | Taylor et al. ..................... | 726/25 |
| 7,219,098 | B2 * | 5/2007 | Goodwin et al. ...................... | 1/1 |
| 7,263,528 | B2 * | 8/2007 | Haff et al. ...................... | 707/622 |
| 7,472,422 | B1 * | 12/2008 | Agbabian ........................ | 726/25 |
| 7,516,476 | B1 * | 4/2009 | Kraemer et al. .................. | 726/1 |
| 2002/0078134 | A1 * | 6/2002 | Stone et al. ..................... | 709/202 |
| 2002/0169819 | A1 * | 11/2002 | Nguyen et al. ................. | 709/202 |
| 2002/0178217 | A1 * | 11/2002 | Nguyen et al. ................. | 709/203 |
| 2003/0131256 | A1 * | 7/2003 | Ackroyd ........................ | 713/201 |
| 2004/0117624 | A1 * | 6/2004 | Brandt et al. ................... | 713/166 |
| 2004/0193918 | A1 * | 9/2004 | Green et al. ..................... | 713/201 |
| 2004/0249824 | A1 * | 12/2004 | Brockway et al. ............ | 707/100 |
| 2005/0010821 | A1 * | 1/2005 | Cooper et al. ................. | 713/201 |
| 2005/0044016 | A1 * | 2/2005 | Irwin et al. ....................... | 705/30 |
| 2005/0066165 | A1 * | 3/2005 | Peled et al. ..................... | 713/165 |
| 2005/0154733 | A1 * | 7/2005 | Meltzer et al. ................... | 707/10 |
| 2006/0085852 | A1 * | 4/2006 | Sima ............................... | 726/22 |
| 2006/0101520 | A1 * | 5/2006 | Schumaker et al. ............ | 726/25 |
| 2006/0184682 | A1 * | 8/2006 | Suchowski et al. ........... | 709/229 |
| 2006/0190441 | A1 * | 8/2006 | Gross et al. ...................... | 707/3 |
| 2006/0256392 | A1 * | 11/2006 | Van Hoof et al. ............. | 358/402 |
| 2007/0130140 | A1 * | 6/2007 | Cytron et al. ..................... | 707/6 |
| 2007/0136814 | A1 * | 6/2007 | Lee et al. ......................... | 726/25 |
| 2007/0250935 | A1 * | 10/2007 | Zobel et al. ..................... | 726/26 |
| 2007/0300299 | A1 * | 12/2007 | Zimmer et al. ................. | 726/22 |
| 2008/0005782 | A1 * | 1/2008 | Aziz ................................ | 726/3 |
| 2008/0077594 | A1 * | 3/2008 | Ota ................................. | 707/10 |
| 2008/0168048 | A1 * | 7/2008 | Bell et al. .......................... | 707/5 |
| 2008/0201384 | A1 * | 8/2008 | Batterywala .................. | 707/200 |
| 2008/0313639 | A1 * | 12/2008 | Kumar et al. .................. | 718/104 |
| 2008/0313733 | A1 * | 12/2008 | Kramer et al. .................. | 726/22 |
| 2009/0271842 | A1 * | 10/2009 | Baumhof ........................ | 726/1 |
| 2009/0293103 | A1 * | 11/2009 | Palmer et al. .................... | 726/3 |
| 2010/0064341 | A1 * | 3/2010 | Aldera ............................ | 726/1 |
| 2010/0180128 | A1 * | 7/2010 | Borden et al. ................. | 713/189 |

* cited by examiner

*Primary Examiner* — Hung T Vy
*Assistant Examiner* — Phuong Thao Cao
(74) *Attorney, Agent, or Firm* — Patent Capital Group

(57) ABSTRACT

A system, method and computer program product are provided for scanning and indexing data for different purposes. Included is a universal engine operable to scan and index data stored in at least one device, for a plurality of different purposes. Further provided is at least one application for controlling the universal engine to perform the scanning and indexing for at least one of the different purposes.

17 Claims, 7 Drawing Sheets

SYSTEM, METHOD AND COMPUTER PROGRAM PRODUCT FOR SCANNING AND INDEXING DATA FOR DIFFERENT PURPOSES

FIELD OF THE INVENTION

The present invention relates to data processing, systems, and more particularly to systems capable of scanning and indexing data.

BACKGROUND

Security, compliance, and search software programs each require adaptive, and often overlapping, knowledge about the content, state, location, access, and usage of a dynamic corpus of data located within respective domains. For example, anti-malware software typically scans and stores information indicative of threats and implements remedial actions. Further, compliance software conventionally scans file content and logs file location and other state information, in order to apply predetermined policies to data usage and storage. Still yet, search software indexes data content to facilitate rapid searching and concept mapping, by using computer algorithms to automatically associate related words, phrases, concepts, etc.

Any attempt to combine the foregoing disparate solutions pose a variety of interoperability challenges by requiring multiple software agents, management layers, indexes, etc. Further, implementing disparate solutions would reduce system efficiency by virtue of the competing and overlapping use of system and network resources. Even still, any attempt to combine such systems would inevitably diminish human productivity by requiring multiple interfaces, policies, workflows, etc.; as well as be cost-prohibitive since they each typically require an enterprise to scale installation to maximize effectiveness.

There is thus a need for addressing these and/or other issues associated with the prior art.

SUMMARY

A system, method and computer program product are provided for scanning and indexing data for different purposes. Included is a universal engine operable to scan and index data stored in at least one device, for a plurality of different purposes. Further provided is at least one application for controlling the universal engine to perform the scanning and indexing for at least one of the different purposes.

DETAILED DESCRIPTION

Figure 1:
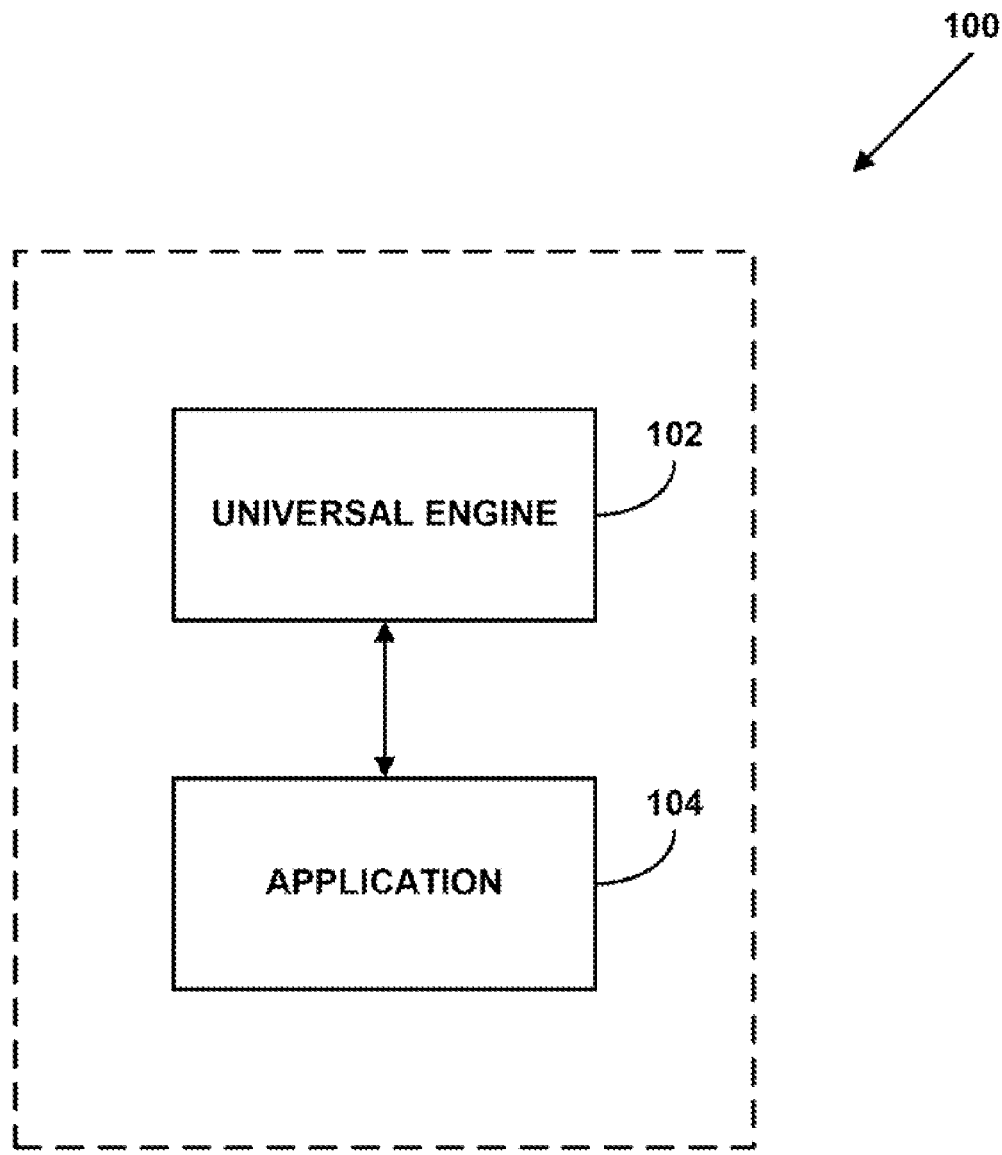
FIG. 1 illustrates a system for scanning and indexing data for different purposes, in accordance with one embodiment.

FIG. 1 illustrates a system 100 for scanning and indexing data for different purposes, in accordance with one embodiment. As shown, provided is a universal engine 102 operable to scan and index data stored in at least one device, for a plurality of different purposes. In the context of the present description, the universal engine 102 may include any hardware and/or software capable of such scanning and indexing of data for more than one purpose. It should be noted that, in various embodiments, the universal engine 102 may be operable to scan and index data stored in a single device or a plurality of different devices.

Further, such scanning may include any analysis of data, while the aforementioned indexing may refer to any processing which results in a data structure that is representative, at least in part, of the data, for facilitating subsequent analysis. Just by way of example, in one optional embodiment, the scanning may include the analysis of the data and/or indexed data utilizing various criteria, patterns (e.g. signatures, etc.), rules, etc. for the purpose of reaching at least one conclusion.

Still yet, the indexing may, in different embodiments, include an automatic classification or manipulation of the data based on content of the data, a creator of the data, a location of the data, metadata associated with the data, and/or any other desired aspect of the data. In an embodiment where the indexing is based on a content of the data, various text analysis may be performed to identify key or repeated terms (e.g. nouns, verbs, etc.). Still yet, such words may be weighted as appropriate (e.g. based on location, use, etc.), Bayesian algorithms may be used, etc. To this end, content-related insight into the data may be provided by a data structure that has a size that is less than that of the data itself. Of course, such examples of contextual indexing are set forth for illustrative purposes only, as any indexing may be used that meets the above definition.

With continuing reference to FIG. 1, also provided is at least one application 104. Such application 104 may include any computer code adapted for controlling, the universal engine 102 to perform the scanning and indexing for at least one of the different purposes. By this design, the universal engine 102 may be used for different purposes by using the desired application 104. It should be noted that the universal engine 102 may be controlled by the application 104 for absolutely any desired purpose. Just by way of example, such different purpose may include, but is not limited to a security purpose, a corporate governance purpose, a data loss prevention purpose, a risk management purpose, a legal purpose, a digital rights management purpose, a data classification purpose, a search purpose, etc.

More illustrative information will now be set forth regarding various optional architectures and features with which the foregoing framework may or may not be implemented, per the desires of the user. For example, the aforementioned scanning and indexing, as well as possibly any action prompted based on such scanning/indexing, may be performed based on predetermined policies. In such embodiment, different policies may be used in conjunction with different applications. In another embodiment, heuristics may be used to control such scanning and indexing, for improved performance, efficiency, etc.

It should be strongly noted that the following information is set forth for illustrative purposes and should not be construed as limiting in any manner. Thus, any of the following features may be optionally incorporated with or without the exclusion of other features described.

Figure 2:
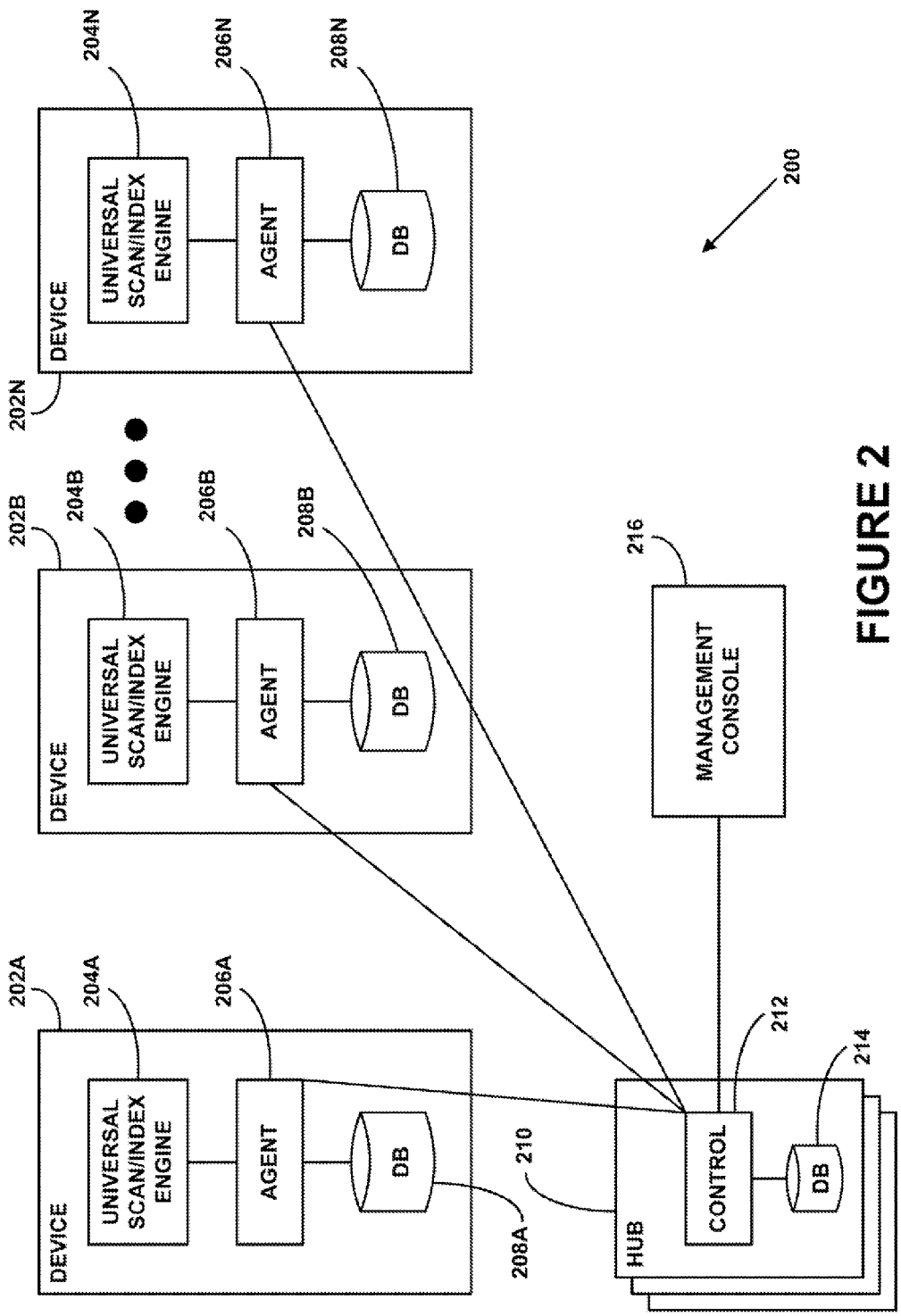
FIG. 2 shows a system for scanning and indexing data for different purposes, in accordance with another embodiment.

FIG. 2 shows a system 200 for scanning and indexing data for different purposes, in accordance with another embodiment. As an option, the system 200 may incorporate the functionality of the architecture and environment of FIG. 1. Of course, however, the system 200 may be implemented in any desired environment. It should also be noted that the aforementioned definitions may apply during the present description.

As shown, a plurality of devices 202A-N are provided. In the context of the present description, the devices 202A-N may each include a desktop computer, lap-top computer, hand-held computer, mobile phone, personal digital assistant (PDA), peripheral (e.g. printer, etc.), any component of a computer or related system, and/or any other type of logic for that matter. In additional embodiments, virtualization techniques may be used in conjunction with the devices 202A-N.

As shown, the devices 202A-N are equipped with universal engines 204A-N capable of scanning and indexing data stored on the respective device. In one embodiment, the universal engines 204A-N may include any combination of hardware and/or software for providing a "natural language processor" that is capable of sorting through a plethora of business-formatted information files, regardless of the data type, file type, file location, etc.

Agents 206A-N remain in communication with the associated universal engines 204A-N, as shown, for controlling such scanning and indexing, as well as taking any desired resulting action, etc. For example, each agent 206A-N may store results of such scanning and indexing in a local database 208A-N, for reasons that will soon become apparent. While the agents 206A-N are shown to reside on the devices 202A-N, embodiments are contemplated in which the agents 206A-N communicate with, but remain separate from the devices 202A-N. In one embodiment, the agents 206A-N may take the form of self-populating/self-propagating bots that automatically crawl a network in the background.

Coupled to one or more of the devices 202A-N is at least one hub 210. Such coupling may, in one embodiment, be accomplished via a network including, but not limited to a local area network (LAN), a wireless network, a wide area network (WAN) such as the Internet, a peer-to-peer network, a personal area network (PAN), etc.

Further, it should be noted that, in various embodiments, a plurality of the hubs 210 may be situated in different regions and further be coupled to different subsets of the devices 202A-N. Still yet, a hierarchical framework may further be provided such that the hubs 210 or subsets thereof) are coupled to additional hubs (not shown). For instance, a hierarchy of regional servers and at least one central server may be provided.

With continuing reference to FIG. 2, each hub 210 is equipped with control logic 212 for communicating with the agents 206A-N for controlling the same. In one embodiment, this may be accomplished utilizing; policies which may be propagated from the hub 210 to the agents 206A-N for controlling the manner in which the agents 206A-N control the universal engines 204A-N as well as any action taken at the devices 202A-N.

To this end, any aspect (e.g. priority, sequence, location, etc.) of the scanning, indexing, and/or resulting action may be controlled based on one or more policies. For example, one or more policies may dictate the criteria, patterns (e.g. sipatures, etc.), etc. with which the data is scanned. Further, such policies may specify what particular data is indexed, based on specific criteria (e.g. a creator of the data, a location of the data, metadata associated with the data, words in the data, etc.). Even still, the policies may indicate which actions are to be taken based on the scanned/indexed data. This may be accomplished, for example, using specific rules that trigger an action based on results of a policy-specific scan of data that has been indexed in a policy-specific manner.

In one embodiment, different policies may be used in conjunction with different applications. While such applications are not shown in FIG. 2, they may include client-based and/or network-based applications that are tailored for using the resources of the system 200 for specific purposes. In various embodiments, such policies may be included with the applications and/or remain a component of the system 200.

By this design, the policies may be used to scan/index data in a manner that makes it more effectively available for use by a purpose-specific application. For instance, a security application may require data to be scanned/indexed differently with respect to a financial application. Further, the actions taken as a result of the uniquely scanned/indexed data will also vary significantly. To this end, the policies ma be used to tailor the various aspects of the system 200 to accommodate the purpose of a particular application executed by the system 200.

To generate and/or modify the aforementioned policies and provide additional administrative functions (e.g. propagation of scan/index results among the local/remote databases, etc.), a centralized management console 216 remains in communication with the hub 210. To this end, policies may be dynamically created and applied on a real-time basis. In various embodiments, the management console 216 may be integrated with or separate from the hub(s) 210. Further, the management console 216 may include a graphical user interface (GUI) for facilitating such operation. In one specific embodiment, the management console 216 may include the ePolicy Orchestrator® offered by McAfee®, Inc.

With continuing reference to FIG. 2, each hub 210 is further equipped with a remote database 214 for storing results of the local scanning and indexing performed by the universal engines 204A-N. Thus, the device-specific, scan/index results may be stored in the local database 208A-N, and an aggregation of such results may be stored in the remote database 214. Of course, such aggregation of results stored in each remote database 214 may be copies of the local database 208A-N or a subset and/or compressed representation thereof. By this design, appropriate data may be stored throughout a network, making it conveniently available as necessary, in one embodiment, such distribution of data may be applied based on the aforementioned policies, as well.

As an option, heuristics may be employed in any desired capacity in the administration of the system 200. For example, the aforementioned policies may be configured or dynamically adapted based on heuristics gathered across the system 200 by way of a feedback loop. In one embodiment, the heuristics are fed back from the devices 202A-N utilizing the associated agents 206A-N. Such heuristics may include, but are not limited to an amount of processing/communication resources available at the associated device 202A-N, a schedule of such resource availability, etc.

Thus, the system 200 is capable of intelligently implementing the foregoing policies in view of such heuristics. For example, the heuristics may drive when and where the indexing and scanning takes place; a location where results of the indexing and scanning are stored; a timing of a communication of the policies, scan/index results, etc.; a timing of any actions taken based on the scan/index results, etc. Of course, such heuristics-driven controls are set forth for illustrative purposes only, as any aspect of the system 200 may be heuristically controlled.

To this end, the system 200 coordinates and/or consolidates scanning, indexing, and policy enforcement efforts using a distributed, heuristic data management system and a feedback loop that is governed by a common set of policies that are managed using the single management console 216. The system 200 is thus self-tuning, self-evolving, and self-modifying to provide an ever-increasingly capable data collection/analysis hornet hierarchy. With guiding scripts/policies entered by humans, the system 200 is capable of narrowing its focus in order to provide increasingly relevant data and/or conclusions based on the analysis of data collected, thus far. These refined data results may then be delivered to an inference engine which is able to coalesce the sorted/prioritized data in order to present to the user a result that is best tuned to the original request issued to the system 200.

In one example of use, each agent 206A-N updates, coordinates, and enforces a set of electronic policies, and the multi-purpose universal engines 204A-N analyze system data as directed by the policy set, and may act based on correlating findings with the policy set. Still yet, each local database 208A-N stores scan results in accordance with the policy set, while each hub 210 communicates with the local databases 208A-N to facilitate data retrievals, as needed, for further analysis or use.

The management console 216, in turn, controls the system 200, updates agent software, and directs data migration from local to centralized indexes. To facilitate such control, the local agents 206A-N communicate local operating conditions, in addition to predetermined indicators, back to the management console 216, thus providing heuristic-feedback that can be used at the administrator level to adjust a priority, nature and sequence of policy enforcement actions across an enterprise, or take specialized, action on a specific resource or group of resources.

Figure 3:
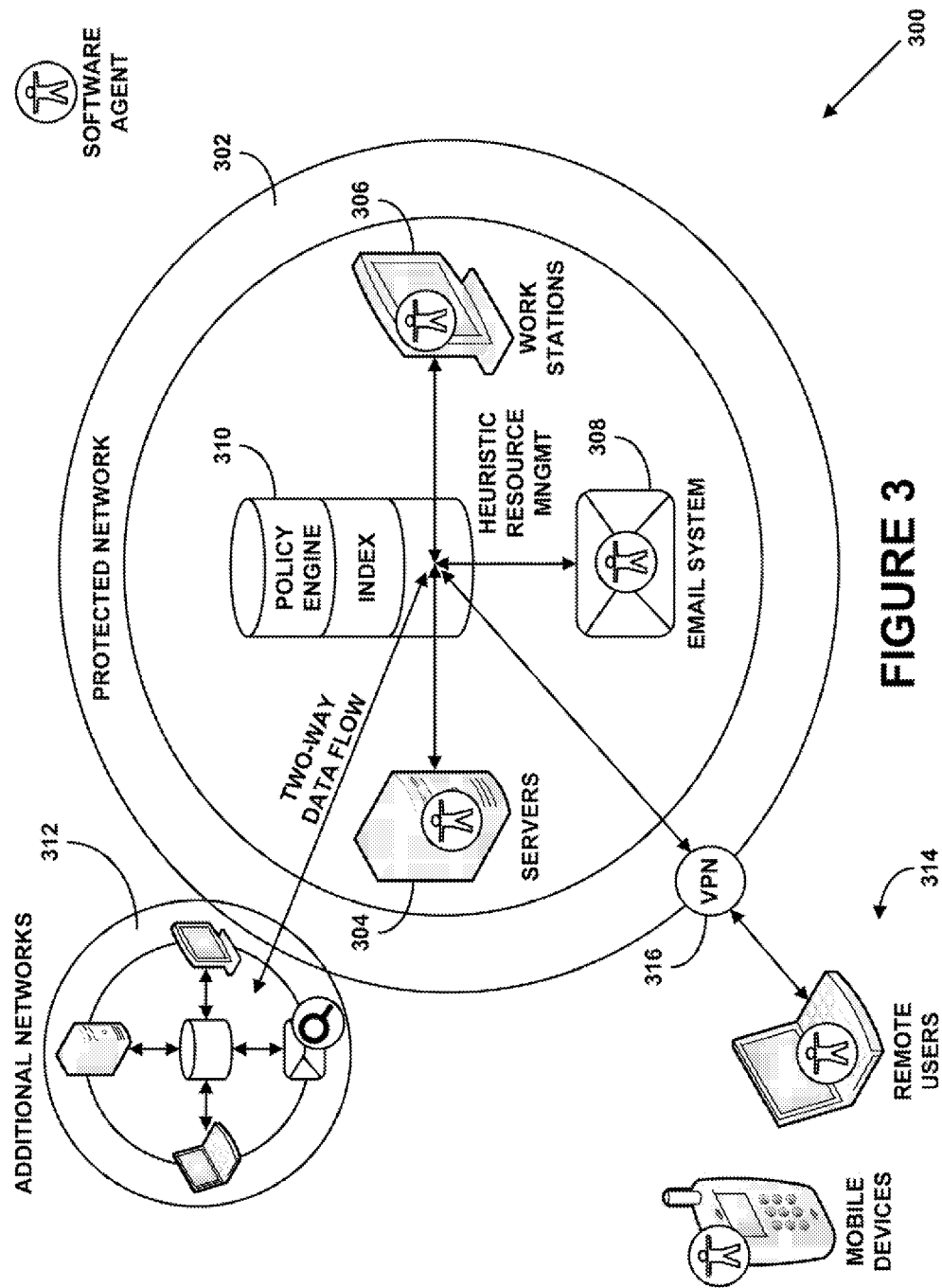
FIG. 3 shows a network level system for scanning and indexing data for different purposes, in accordance with yet another embodiment.

FIG. 3 shows a network level system 300 for scanning and indexing data for different purposes, in accordance with yet another embodiment. As an option, the system 300 may incorporate the functionality of the architecture and environment of FIGS. 1-2. Of course, however, the system 300 may be implemented in any desired environment. Again, the aforementioned definitions may apply during the present description.

As shown, a protected network 302 is provided including a plurality of components including, but not limited to servers 304, workstations 306, an email system 308, etc. Coupled to such components is logic 310 adapted for scanning and indexing data stored on such components, storing results of such processing, and taking any resulting action based on heuristically-driven policies.

As further shown, an additional network 312 as well as additional devices 314 may be provided. In one embodiment, such additional network 312 and/or additional devices 314 may communicate with the protected network 302 by way of a virtual private network (VPN) connection 316 or utilizing any other desired technique. To this end, scan/index results and policy information may be distributed among multiple networks and devices, in a secure manner. For example, the protected network 302 may include data that is to remain most secure, while other data may be stored at the additional network 312 as well the additional devices 314.

Figure 4:
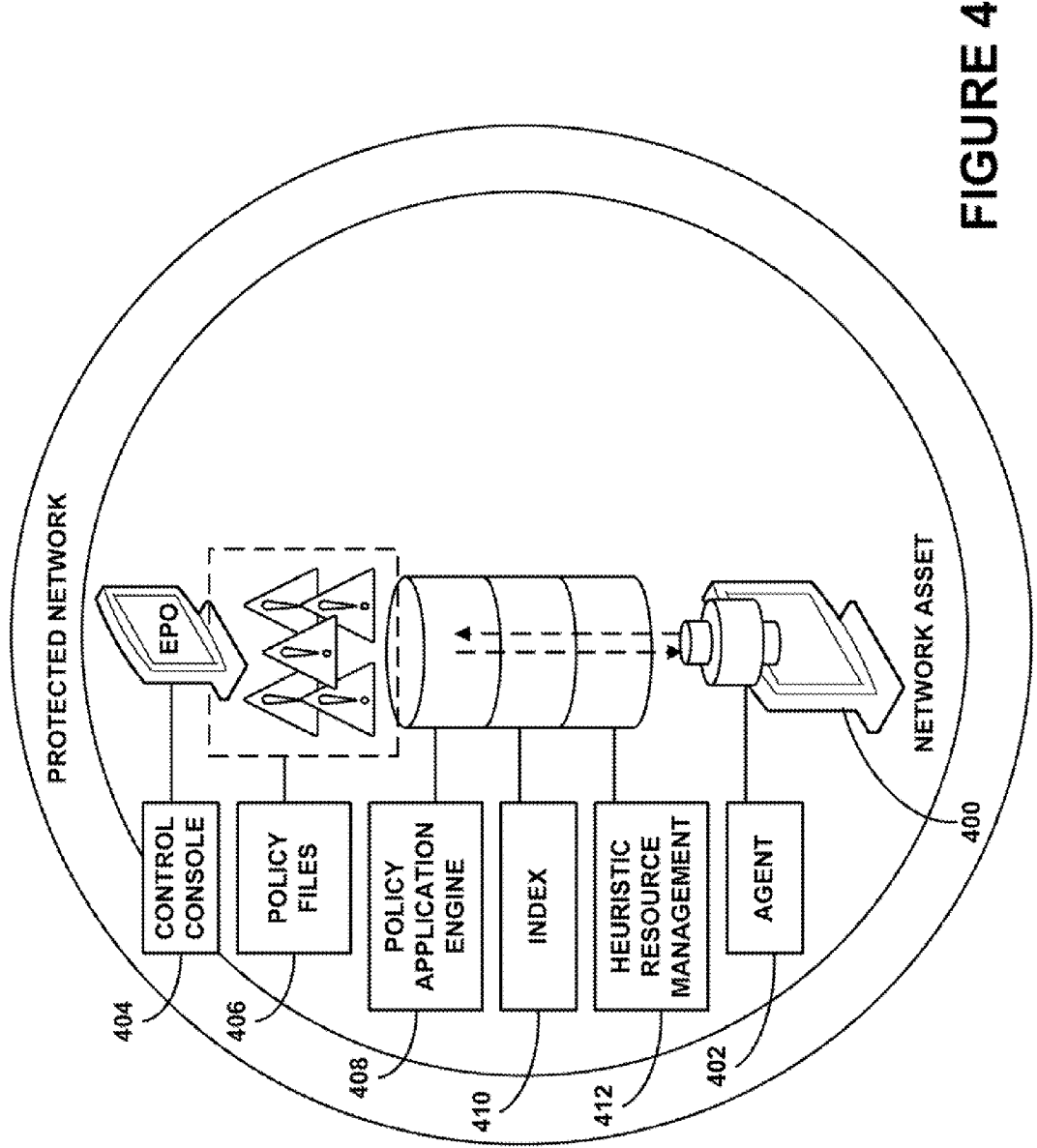
FIG. 4 shows a device for scanning and indexing data for different purposes, in accordance with still yet another embodiment.

FIG. 4 shows a device 400 for scanning and indexing data for different purposes, in accordance with still yet another embodiment. As an option, the device 400 may be incorporated in the context of the architecture and environment of FIGS. 1-3. Of course, however, the system 400 may be implemented in any desired environment. Yet again, the aforementioned definitions may apply during the present description.

As illustrated, the device 400 includes an agent 402 loaded thereon which allows local indexing of data and policy enforcement that is synchronized by a central administrator (e.g. via a control console 404, etc.). Further included are a variety of components including a plurality of policy files 406, a policy application engine 408, an index component 410, and a heuristic management component 412.

In use, the policy files 406 are received under the direction of the control console 404 for use by the policy application engine 408 to provide for specific actions to be invoked by different applications. Such policy application engine 408 executes policies in the policy files 406 based on pre-set factors and heuristic analysis of local and system-level conditions. Further, the index component 410 provides for a dynamic repository of file content and metadata, thus serving as an enterprise knowledge storehouse. The heuristic management component 412 controls the timing/size of data flow between resources based on priority, bandwidth, and/or asset usage, etc. To this end, data may be locally indexed and transferred to a central repository; and updates, queries, commands, etc. may be transmitted back.

Figure 5A:
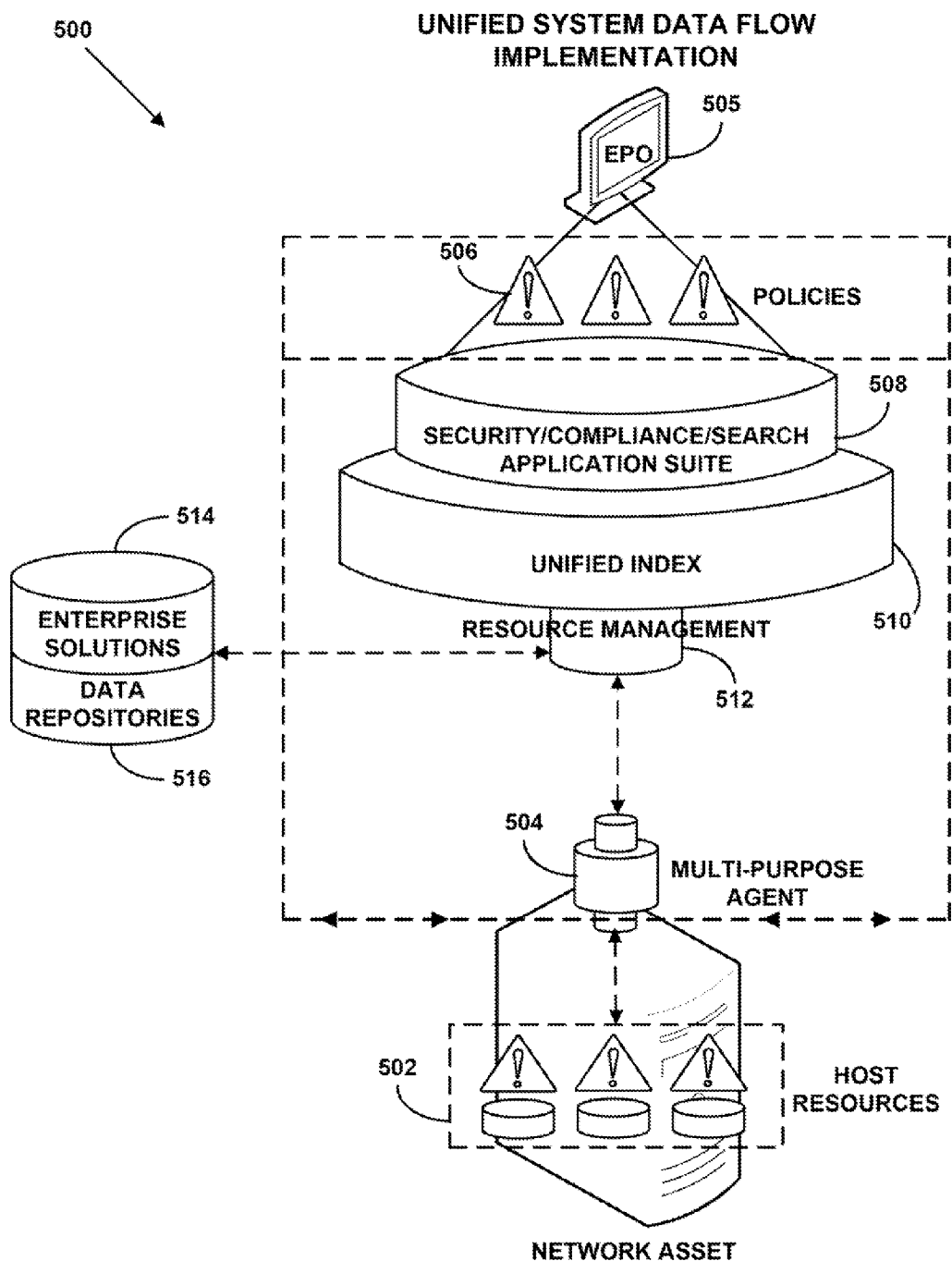
FIGS. 5A-5B show a system for scanning and indexing data for different purposes, in accordance with different embodiments.
Figure 5B:
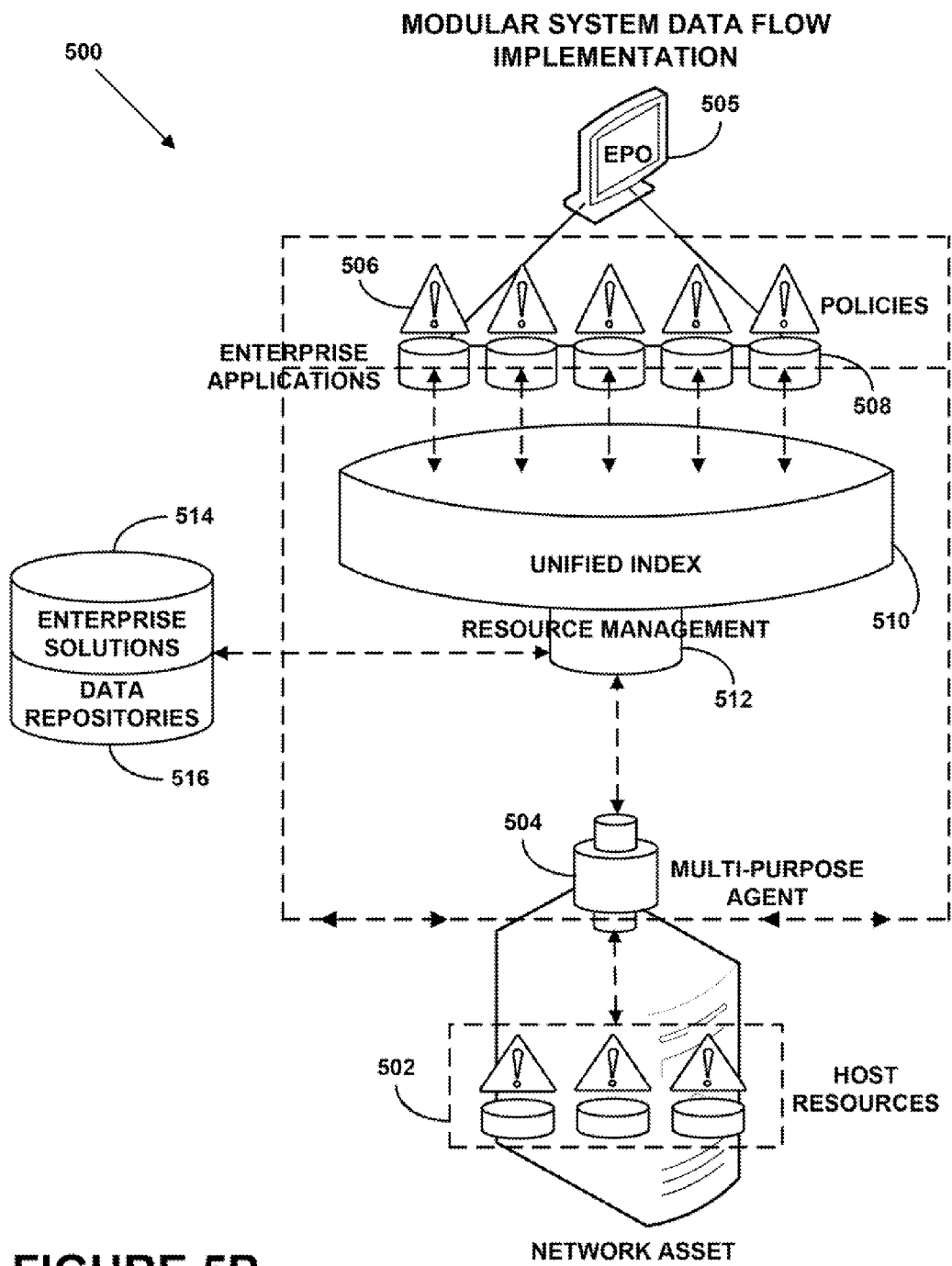

FIGS. 5A-5B show a system 500 for scanning and indexing data for different purposes, in accordance with different embodiments. As an option, the system 500 may incorporate the functionality of the architecture and environment of FIGS. 1-4. Of course, however, the system 500 may be implemented in any desired environment. Yet again, the aforementioned definitions may apply during the present description.

As shown in FIG. 5A, the system 500 includes at least one device 502 equipped with a multi-purpose agent 504 that has access to a multitude of resources. Such agent 504 serves to synchronize with a management console 505 and hook local applications, ports, resources, etc. to monitor activity and enforce a plurality of policies 506. Such policies 506 dictate what type of data is indexed, and then leverage resource management to determine where and when to index data, as will soon become apparent.

In use, the management console 505 may administer the policies 506 by distributing the same to enterprise and host-based applications 508. Such applications 508 may include security, compliance, search and any other type of programs that depend, at least in part, on scanning and indexing of data. While FIG. 5A illustrates the applications 508 being organized in a single suite of applications, it should be noted that other embodiments are contemplated where the applications 508 are discretely provided. See, for example. FIG. 5B.

Further, a unified index storage 510 connects to all data sources, providing enterprise search and data classification which can be leveraged by the designated applications 508. Under the control of a resource management module 512, complex computing tasks can be performed using idle machines in another geographical location to minimize impact on network performance during work hours. To accomplish this, the resource management module 512 may remain in communication with a variety of enterprise solutions 514 and data repositories 516.

Thus, the resource management module 512 may provide for workload distribution across the network, based on bandwidth, usage, and priority factors. Further, large data transfers and complex computing functions may take place when resources are idle or underutilized. For example, during work hours, indexing may occur locally as a background task (e.g. using servers, workstations, etc.). Further, at night or during idle time, indexed data may be transferred from the workstations and servers to regional data hubs. Likewise, policy updates and instructions may be distributed from the hubs to each network device.

A distributed knowledge management system is thus provided including policy-based content and meta-data indexing, of electronic data in a computer network utilizing a distributed indexing/storage architecture. In a variety of embodiments, such architecture may include, among other things, a central data indexing hub, regional data hubs, and local agents capable of performing and/or directing local indexing/storage functions based on predetermined policies and/or at the direction of the central or regional data hubs.

Further, heuristic resource management functionality may be provided that connects every network asset to the central data hub and/or regional hubs and provides real-time and/or on-access assessments of asset usage, state information, and data content. This data may, in turn, be used by the central or regional data hubs to regulate the implementation of data management policies and information requests, including a scope/frequency of indexing and security protocols. The data may further be used to coordinate and execute distributed computing functions, and monitor overall network integrity, efficiency, and usage.

Still yet, integrated policy application functionality may be provided that leverages the distributed data index and heuristic resource management modules to execute electronic policies across the network or on specific network assets. Policies may thus encompass data management, accessibility, security and compliance functions.

To this end, various features may or may not be provided, as desired. For example, the system may provide improved access to corporate knowledge stored as electronic data. It may employ automated data classification technologies to enforce policies and manage information access/use (security), maintenance, storage and deletion. Further, investigative efforts, including audits and electronic discovery, may be streamlined. Network assets may also be leveraged to perform complex computing tasks and minimize under-utilization of resources. Thus, provided is a comprehensive data management model that integrates resource management, information accessibility, security, and policy enforcement in the context of a networked computing environment.

Figure 6:
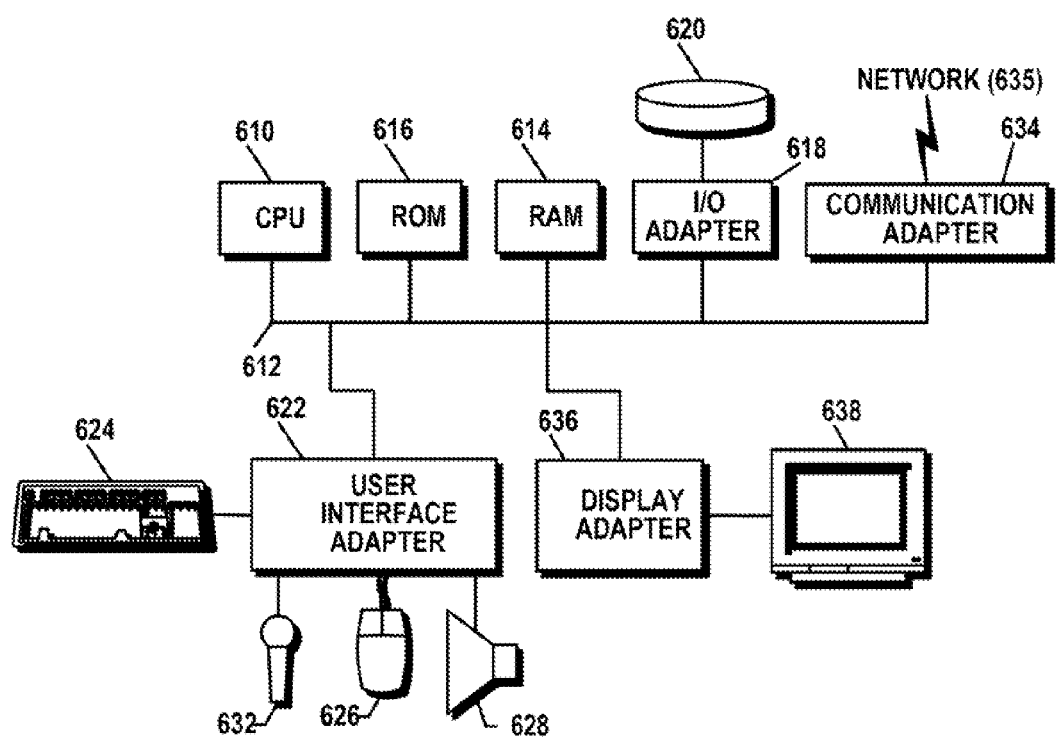
FIG. 6 shows a representative hardware environment that may be associated with any of the devices illustrated in the previous figures, in accordance with one embodiment.

FIG. 6 shows a representative hardware environment that may be associated with any of the devices illustrated in the previous figures, in accordance with one embodiment. Such figure illustrates a typical hardware configuration of a workstation in accordance with one embodiment having a central processing unit 610, such as a microprocessor, and a number of other units interconnected via a system bus 612.

The workstation shown in FIG. 6 includes a Random Access Memory (RAM) 614, Read Only Memory (ROM) 616 an I/O adapter 618 for connecting peripheral devices such as disk storage units 620 to the bus 612, a user interface adapter 622 for connecting a keyboard 624, a mouse 626, a speaker 628, a microphone 632, and/or other user interface devices such as a touch screen (not shown) to the bus 612, communication adapter 634 for connecting the workstation to a communication network 635 (e.g., a data processing network) and a display adapter 636 for connecting the bus 612 to a display device 638.

The workstation may have resident thereon any desired operating system, it will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a processor and a memory;
a universal engine configured to scan and index data stored in at least one device, for a plurality of different purposes; and
a plurality of applications configured to control the universal engine for performing the scanning and indexing for a respective one of the plurality of purposes, where an agent is provisioned on the at least one device and configured to:
receive a policy via a network from a management console;
control the scanning and indexing performed by the universal engine based on the policy;
perform an action based on a result of the scanning and the indexing that includes, at least, storing results of the scanning and the indexing; and
communicate heuristics from the at least one device via the network to the management console, which is configured to dynamically configure policies based on the heuristics via a feedback loop, wherein the heuristics include information regarding an amount of processing or communication resources available at the at least one device and a schedule of resource availability.

2. The system of claim 1, wherein instances of the universal engine are provisioned at a plurality of devices and the instances are configured to scan and index data stored in the plurality of devices.

3. The system of claim 1, wherein the policy includes signatures to be applied to the data.

4. The system of claim 1, wherein the action includes storing the results in a local database.

5. The system of claim 1, wherein an aspect of at least one of the scanning, the indexing, and the action is controlled based on a the policy.

6. The system of claim 1, wherein the policy is received via a wireless network.

7. The system of claim 1, wherein the policy is configured based, at least in part, on additional heuristics provided by a plurality of devices.

8. The system of claim 1, wherein a copy of the results is stored in a remote database.

9. The system of claim 1, wherein the heuristics are aggregated to additional heuristics received from a plurality of devices.

10. The system of claim 5, wherein the aspect involves at least one of a priority and a sequence of at least one of the scanning, the indexing, and the action.

11. The system of claim 1, wherein the results of the scanning and indexing are provided to an inference engine configured to process the results for presentation to a user.

12. The system of claim 1, wherein at least a portion of the results of the scanning and indexing is stored at a central server connected to the at least one device via the network.

13. The system of claim 1, wherein at least a portion of the results of the scanning and indexing is stored at a plurality of regional servers connected to the at least one device via the network.

14. The system of claim 1, wherein a location where at least a portion of the results of the scanning and indexing is stored is controlled by the management console.

15. The system of claim 1, wherein the plurality of purposes include a selected one of a group of purposes, the group consisting of: a corporate governance purpose, a data loss prevention purpose, a risk management purpose, a legal purpose, a digital rights management purpose, a data classification purpose, and a search purpose.

16. A computer program product embodied on a non-transitory computer readable medium for performing operations, comprising:
   scanning and indexing data, stored in at least one device, for a plurality of different purposes; and
   controlling the scanning and indexing for at least one of the different purposes, where an agent is provisioned on the at least one device and configured to:
      receive a policy via a network from a management console;
      control the scanning and indexing based on the policy;
      perform an action based on a result of the scanning and the indexing that includes, at least, storing results of the scanning and the indexing; and
      communicate heuristics from the at least one device via the network to the management console, which is configured to dynamically configure policies based on the heuristics via a feedback loop, wherein the heuristics include information regarding an amount of processing or communication resources available at the at least one device and a schedule of resource availability.

17. A method, comprising:
   scanning and indexing data, stored in at least one device, for a plurality of different purposes;
   controlling the scanning and indexing for at least one of the different purposes, where an agent is provisioned on the at least one device and configured to:
      receive a policy via a network from a management console;
      control the scanning and indexing based on the policy;
      perform an action based on a result of the scanning and the indexing that includes, at least, storing results of the scanning and the indexing; and
      communicate heuristics from the at least one device via the network to the management console, which is configured to dynamically configure policies based on the heuristics via a feedback loop, wherein the heuristics include information regarding an amount of processing or communication resources available at the at least one device and a schedule of resource availability.

* * * * *